United States Patent
Childs (10) Patent No.: US 10,044,267 B1
(45) Date of Patent: *Aug. 7, 2018

(54) CURRENT EMULATION AUTO-CALIBRATION WITH PEAK-CURRENT SERVO

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,436

(22) Filed: Dec. 14, 2017

(51) Int. Cl.
  *H02M 3/157* (2006.01)
  *H02M 1/00* (2006.01)
  *H02M 3/158* (2006.01)

(52) U.S. Cl.
  CPC .......... *H02M 3/157* (2013.01); *H02M 3/1588* (2013.01); *H02M 2001/0009* (2013.01)

(58) Field of Classification Search
  CPC ........ H02M 3/156–3/1588; H02M 2001/0009; H02M 323/271; H02M 323/282; Y02B 70/1466; G01R 19/0092; G05F 1/462; H02H 3/087
  See application file for complete search history.

(56) References Cited

U.S. PATENT DOCUMENTS

| | | | |
|---|---|---|---|
| 6,643,145 B1 * | 11/2003 | Harrison | H02M 3/157 363/16 |
| 6,803,750 B2 | 10/2004 | Zhang | |
| 6,879,136 B1 | 4/2005 | Erisman et al. | |
| 7,107,468 B2 | 9/2006 | Pullen et al. | |
| 7,135,841 B1 | 11/2006 | Tomiyoshi et al. | |
| 7,541,794 B2 | 6/2009 | Tabaian et al. | |
| 7,791,321 B2 | 9/2010 | Xu et al. | |
| 7,936,160 B1 | 5/2011 | Sheehan | |

(Continued)

FOREIGN PATENT DOCUMENTS

EP   2 555 399   2/2013

OTHER PUBLICATIONS

European Search Report, Application No. 13368040.5-1804, Applicant: Dialog Semiconductor GmbH, dated May 30, 2014, 7 pgs.

(Continued)

*Primary Examiner* — Kyle J Moody
*Assistant Examiner* — Peter Novak
(74) *Attorney, Agent, or Firm* — Saile Ackerman LLC; Stephen B. Ackerman (57) ABSTRACT

A peak-current sampling circuit, with current emulation auto-calibration, is disclosed, to create a current-mode control scheme, in a DC-DC switching converter, operating at frequencies above where traditional current-mode control schemes fail. To accomplish this, a replica signal is created inside a switching converter that emulates the current in the coil. This internal signal can then be used to control the switching converter. This signal will not suffer the ringing and long settling times that affect the actual current signal. This signal can also have a much larger magnitude than the actual current signal, and can therefore trigger the comparator with less delay. This signal can then be auto-calibrated to ensure it matches the actual coil current of the DC-DC switching converter.

47 Claims, 8 Drawing Sheets

(56) References Cited

U.S. PATENT DOCUMENTS

| | | |
|---|---|---|
| 9,577,509 B2 * | 2/2017 | Wang .................... H02M 1/32 |
| 9,654,007 B1 | 5/2017 | Childs |
| 9,742,280 B2 | 8/2017 | Childs et al. |
| 9,768,688 B2 | 9/2017 | Repton et al. |
| 2011/0169476 A1 | 7/2011 | Ikriannikov et al. |
| 2013/0027009 A1 | 1/2013 | Tang et al. |
| 2013/0051107 A1 | 2/2013 | Rettig et al. |
| 2014/0239925 A1 * | 8/2014 | Tanabe ................ H02M 3/1582 |
| | | 323/271 |
| 2015/0097542 A1 | 4/2015 | Repton et al. |
| 2016/0036326 A1 * | 2/2016 | Sreenivas ............. H02M 3/158 |
| | | 323/271 |

OTHER PUBLICATIONS

Co-pending US Patent DS15-020, U.S. Appl. No. 15/189,210, filed Jun. 22, 2016, "Hybrid Buck," by Mark Childs, 24 pgs.

Co-pending US Patent DS15-021, U.S. Appl. No. 15/701,946, filed Sep. 12, 2017, "Peak Current Servo," by Mark Childs, 28 pgs.

Co-pending US Patent DS15-089/098, U.S. Appl. No. 15/278,492, filed Sep. 28, 2016, "An Asymmetric Two-Stage DC-DC Switching Converter," by Mark Childs, 38 pgs.

* cited by examiner

CURRENT EMULATION AUTO-CALIBRATION WITH PEAK-CURRENT SERVO

BACKGROUND

Related Patent Applications

This application is related to U.S. application Ser. No. 15/189,210 (DS15-020), filed on Jun. 22, 2016, which is owned by a common assignee and is herein incorporated by reference in its entirety, to German application DE 10 2016 217 857.1 (DS15-021), filed on Sep. 19, 2016, which is owned by a common assignee and is herein incorporated by reference in its entirety, and to U.S. patent application Ser. No. 14/052,844 (DS2012-049), filed on Oct. 14, 2013, which is owned by a common assignee and herein incorporated by reference in its entirety. This application is also related to U.S. application Ser. No. 15/263,732 (DS15-059), filed on Sep. 13, 2016, which is owned by a common assignee and is herein incorporated by reference in its entirety, and to U.S. application Ser. No. 15/278,492 (DS15-089_098), filed on Sep. 28, 2016, which is owned by a common assignee and is herein incorporated by reference in its entirety.

Field

The disclosure relates generally to Buck, Boost, Buck-Boost and other types of DC-DC switching power converters, operating in current-mode control with increasing switching frequencies.

Description of Related Art

Buck switching converters may be operated in current-mode control. This is convenient as the control scheme is relatively simple and robust, and offers fast response speeds with high bandwidth. One advantage of a current-mode control switching converter is that it is simple to implement an accurate peak-current limit when using current-mode control, as disclosed in related German application DE 10 2016 217 857.1 (DS15-021). Another advantage of current-mode control is that it allows convenient methods to control the relative output currents, of different phases in a multi-phase switching converter, as disclosed in related patent application Ser. No. 15/189,210 (DS2015-020).

Current-mode control allows the use of different value coils for different phases and to optimize the switching converter efficiency over a very large output range, as disclosed in related patent application Ser. No. 14/052,844 (DS2012-049). Using current-mode control allows the mixing of different types of phases fairly easily, even with very different phase characteristics, such as coil value, switching frequency, and maximum current, as disclosed in related patent application Ser. No. 15/263,732 (DS15-059).

However, for cycle-by-cycle current-mode control to operate, there must be sufficient time when one of the pass-devices is turned on to allow the coil current to be measured, and to take action on that measurement. Typically it might take 10 ns for the pass-device to turn on and for the current in that device to settle, there may be another 10 ns for a comparator to detect the current and raise a flag, and there may be another 10 ns for that signal to pass through the control logic and actually switch the state of the pass-devices. This limits the use current-mode control to around 25 HMz switching frequency for a practical switching converter design.

Faster switching frequencies allow the output current ripple for a given inductor value to be reduced. This in turn can be used to allow smaller output capacitors, reduced output voltage ripple or greater average output current for a given Isat value. Faster switching frequencies also allow smaller value inductors, which allow faster response speeds, and higher bandwidth, from the switching converter, improving load transient response, as disclosed in related patent application Ser. No. 15/278,492 (DS15-089_098).

Current-mode control in Buck switching converters has been previously used to mix low-frequency peak-mode phases with high-frequency peak-mode phases. Current-mode control has also been used to mix low-frequency peak-mode phases with high-frequency valley-mode phases. It is therefore a desire to continue to use current-mode control even as the switching frequency increases, to the point where cycle-by-cycle current-mode control becomes impossible.

SUMMARY

An object of the disclosure is to provide a current emulation auto-calibration circuit, comprising a peak current sampling circuit, configured to create a current-mode control scheme, that can operate at frequencies above the point where traditional current-mode control schemes fail.

A further object of the disclosure is to allow fast switching frequencies in current-mode control Buck, Boost, Buck-Boost and other types of DC-DC switching power converters.

Still further, another object of the disclosure is to allow the integration of fast phases with other phases of very different characteristics, with no external current sense element, or pin, required to allow external coil current measurement.

Still further, another object of the disclosure is to mix low-frequency peak-mode phases with high-frequency peak-mode phases.

Still further, another object of the disclosure is to mix low-frequency peak-mode phases with high-frequency valley-mode phases.

Still further, another object of the disclosure is to mix low-frequency peak-mode phases with high-frequency average-mode phases.

To accomplish the above and other objects, a DC-DC switching converter with current emulation auto-calibration is disclosed, comprising an integrating element configured to accumulate an emulated inductor current based on an output voltage and a supply voltage, a first sampling circuit, configured to obtain a sample of an actual inductor current, and a second sampling circuit, configured to obtain a sample of the emulated inductor current. The DC-DC switching converter further comprises a comparator configured to compare the sample of the actual inductor current with the sample of the emulated inductor current, and a counter, configured to increment or decrement a stored value of the emulated inductor current, based on an output of the comparator.

The above and other objects are further achieved by a method for current emulation auto-calibration, in a DC-DC switching converter. The steps include providing a DC-DC switching converter with an integrating element configured to accumulate an emulated inductor current based on an output voltage and a supply voltage. The steps also include sampling an actual inductor current, and sampling an emulated inductor current. The steps also include comparing the actual inductor current with the emulated inductor current with a comparator. The steps also include successively incrementing or decrementing a counter, with a stored value of the emulated inductor current, based on an output of the comparator.

In various embodiments the function may be achieved using a Buck, Boost, or Buck-Boost DC-DC switching converter.

In various embodiments the function may be achieved using a PMOS high side device.

In various embodiments the function may be achieved using a NMOS low side device.

In various embodiments, the function may be achieved with a replica signal created inside the switching converter, using a current into a capacitor to emulate the coil current.

In various embodiments, the function may be achieved with a replica signal created inside the switching converter, using an integrating circuit such as a digital counter, to compute the current slope to emulate the load.

DETAILED DESCRIPTION

As disclosed in U.S. application Ser. No. 15/189,210, filed on Jun. 22, 2016, a multi-phase DC-DC switching converter sometimes contains both peak-mode phases and valley-mode phases. And as disclosed in German application DE 10 2016 217 857.1, filed on Sep. 19, 2016, a DC-DC switching converter may have a peak current servo, consisting of a high side and a low side device, where the peak high side device current is sampled just before the point when the high side device switches off. This disclosure provides a DC-DC current-control switching converter, with peak-mode control circuitry, configured to create a current-mode control scheme that can operate at frequencies above the point where traditional current-mode control schemes fail, as well as operate at lower frequencies.

In one embodiment, a replica signal is created inside the switching converter, using a current into a capacitor to emulate the coil current. This signal must then be auto-calibrated to ensure it matches the real coil current of the switching converter, by comparing a sampled coil current signal with a sampled measurement of the emulated signal. In another embodiment, a replica signal is created inside the switching converter, using an integrating circuit such as a digital counter, to compute the current slope to emulate the load.

Figure 1:
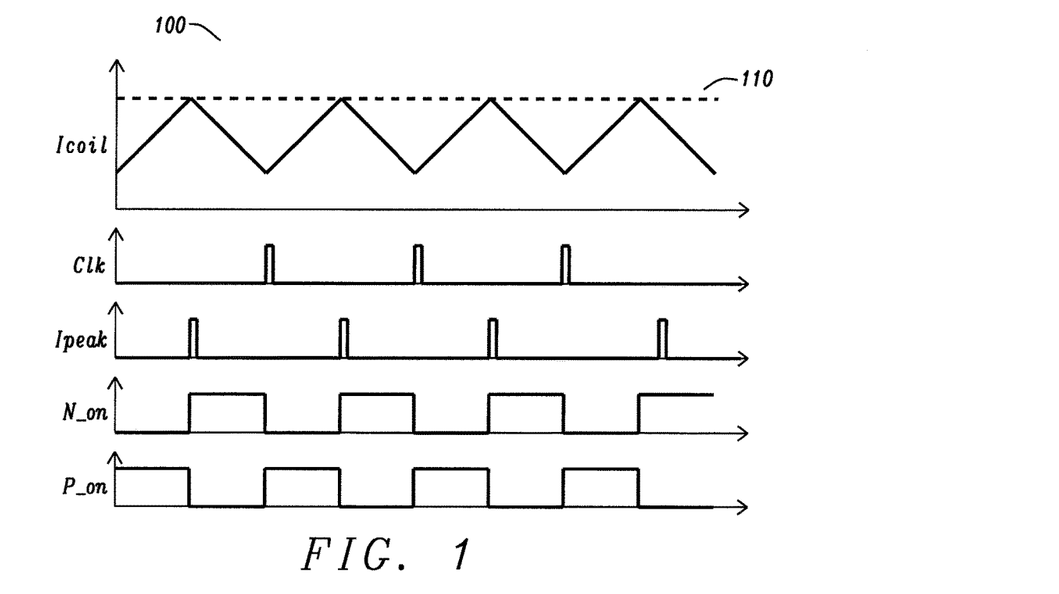
FIG. 1 illustrates a diagram of the normal operation of a Buck switching converter in continuous conduction mode (CCM), using peak-mode current control, of the prior art.

In DC-DC switching converters with direct-current control and a peak-mode scheme, high switching frequencies greater than 10 MHz are typically not implemented. FIG. 1 illustrates diagram 100, of the normal operation of a Buck switching converter in continuous conduction mode (CCM), using peak-mode current control, of the prior art. In normal CCM, the current in the coil is represented by triangular wave Icoil. The rising slope of this current is defined by Sup=(Vdd−Vout)/L where Vdd is the supply voltage, Vout is the output voltage of the Buck, and L is the inductance of the coil. The falling slope of this current is defined by Sdn=Vout/L. The coil current will rise whenever the high side device is on, P_on high, and fall whenever the low side device is on, N_on high.

In CCM mode, the high side device is turned on by clock signal Clk. The current in the coil then ramps up linearly. The current is monitored, and when it hits upper-threshold value 110, a flag Ipeak is raised. This flag will turn off the high side device and turn on the low side device. The current in the coil will then ramp down linearly, until the next clock restarts the cycle. If the peak current threshold is controlled to be a function of the output voltage error, the output voltage of the Buck switching converter can be effectively controlled.

The proposed disclosure shows how it is possible to create an internal signal that emulates the coil current, where Vdd and Vout are measured, and the approximate value of L is known to a reasonable confidence, as specified for the switching converter. An internal voltage represents the coil current, and it is designed such that a current is controlled proportional to Vdd−Vout, and flows onto the top plate of a capacitor when the high side device is on. The voltage on the capacitor will then charge up when the high side device is on, with a slope proportional to Vdd-Vout.

The slope of the current in the coil during the high-side on-time is given as:

$$Sup=(Vdd-Vout)/L$$

Then for a given capacitor the slope of the voltage across the capacitor is given by:

$$dV/dt=I/C$$

So if the voltage across the capacitor is to be proportional to the current in the coil the currents into the capacitor should be controlled such that:

$$I=k(Vdd-Vout)/L$$

The proposal allows for a control current to be proportional to Vout. This is then arranged to flow off of the top plate of the capacitor when the low side device is on. The voltage on the capacitor will then discharge when the low side device is on, with a slope proportional to Vout. In this way, the voltage on the capacitor will emulate the current in the coil. The voltage on the capacitor can then be used to control the Buck switching converter, using current-mode control with the emulated current signal, instead of the actual coil current. In this way, cycle-by-cycle, duty-cycle control can be implemented at high frequency in a DC-DC switching converter.

Figure 2:
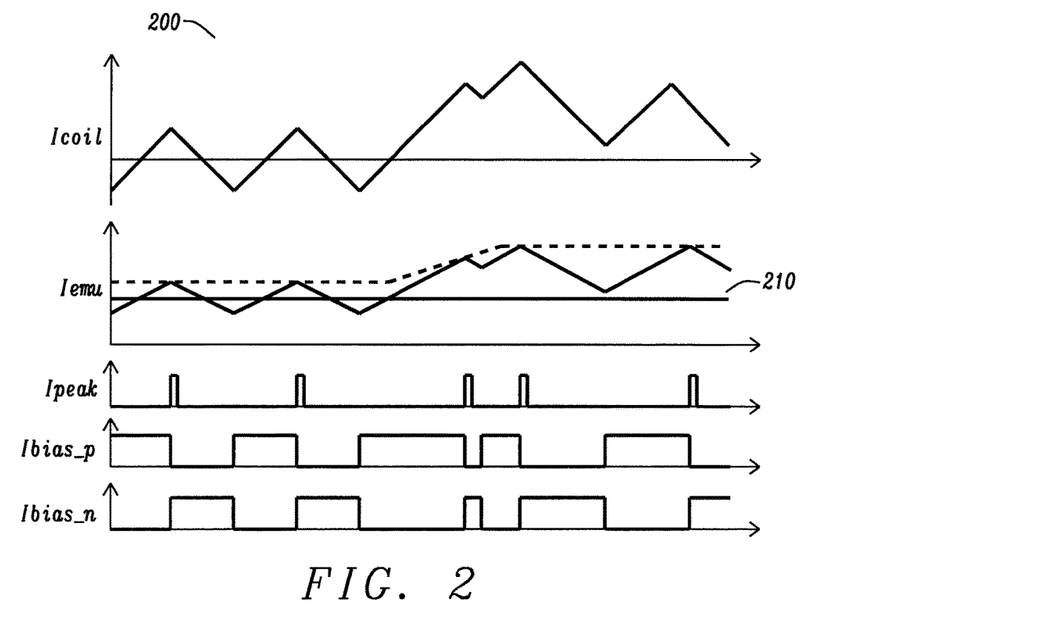
FIG. 2 shows the actual coil current, compared to the emulated coil current, of the switching converter using current-mode control, embodying the principles of the disclosure.

FIG. 2 shows actual coil current 200, compared to the emulated coil current of the switching converter, using current-mode control. In the diagram, the actual coil current is Icoil, and the emulated coil current signal is Iemu. For this case, the emulated signal is measured against a reference voltage Vmid 210. The peak current threshold is then indicated with a dashed line. Peak-current flag signal Ipeak is generated when the emulated current crosses the peak current threshold. In this way, the peak-current signal is not generated from the actual coil current signal. Whenever the high side device is on, the current source signal Ibias_p is switched onto the cap, and the emulated current signal ramps up. Whenever the low side device is on, the current sink signal Ibias_n is switched onto the cap, and the emulated current signal ramps down.

The current in the coil is naturally referenced to zero. Normally the current in the coil can be both positive, out of the buck converter supplying the load, and negative, back into the buck converter discharging the load. In FIG. 2, the buck converter initially is supplying no load, and the coil spends half the time with positive current in it, and half the time with negative current. The mean current is therefore zero. In the emulation circuit of the disclosure, a voltage is created that is proportional to the current in the coil. However, negative voltages are difficult to create and process, and therefore an offset is added. All emulated voltages are moved up, which means positive voltages represent reasonable negative currents. A reference voltage is therefore created, which in the voltage domain will represent zero current in the coil. One convenient reference voltage is the mid-rail voltage Vmid, half of the supply voltage, but other arbitrary voltage values could be chosen as the reference.

For the disclosure circuit to function, the emulated current signal must be correlated with the actual coil current. While the actual coil current is not used to control the switching converter in this case, it is possible to measure the final value over a single cycle, at high frequencies.

When the high side device turns on, the output voltage and supply current both ring. This prevents accurate measurement of the coil current until these values settle sufficiently. Once the coil current signal has settled, it may be sampled onto an internal capacitor. In this scheme, just before the high side device turns off, the sampled signal is isolated from the coil and held internally. The emulated signal is sampled and held in exactly the same way. The two stored signals may then be compared, and this comparison is no longer a time-critical measurement. The comparison then gives an indication of whether the emulated current signal is higher or lower than the real coil current. This will then be used to slowly adjust the emulated signal over many cycles, to ensure it is an accurate reflection of the real coil current.

Figure 3:
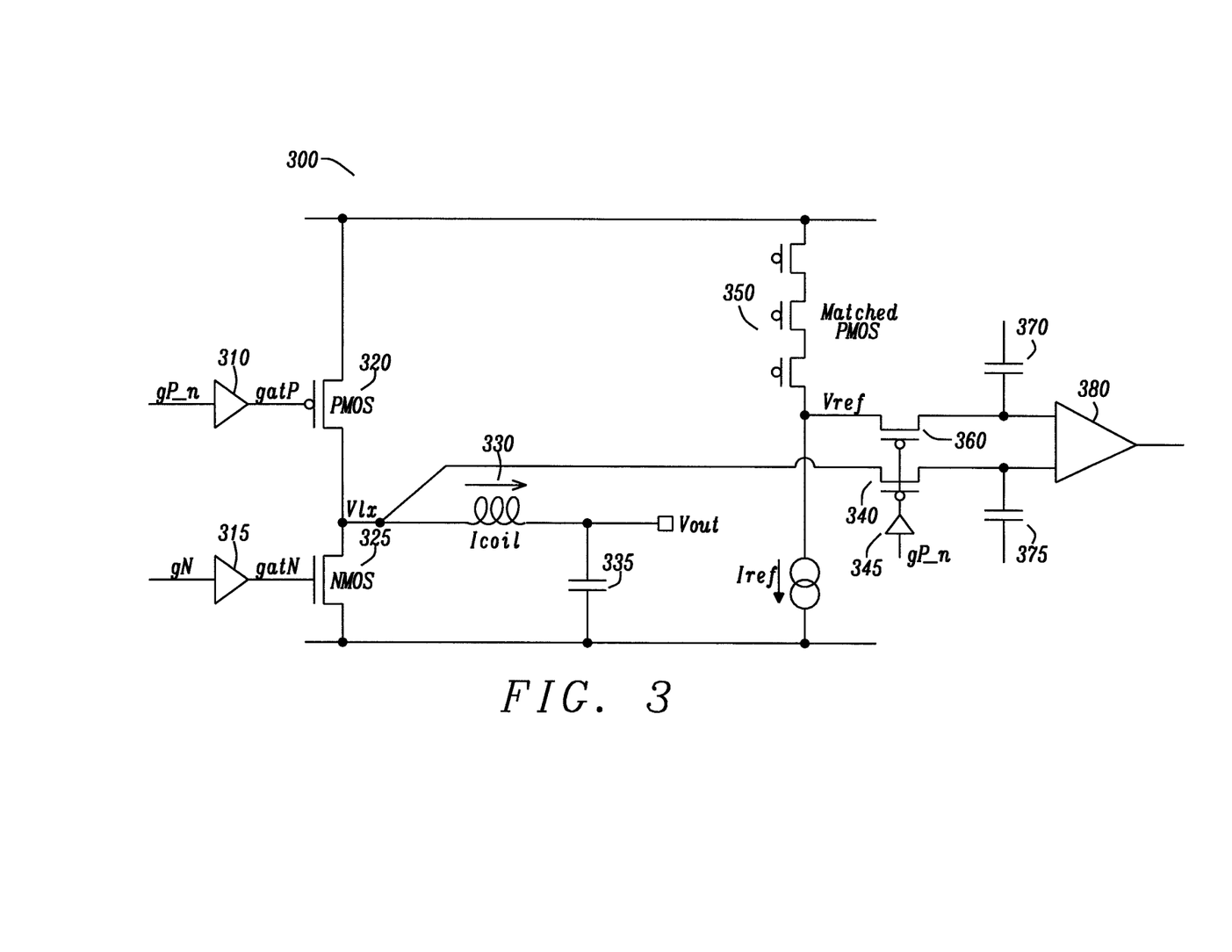
FIG. 3 is a circuit diagram illustrating a Buck switching converter implemented with a peak current servo, where sampling and comparing the LX node and reference voltages is achieved.

FIG. 3 is circuit diagram 300 illustrating a Buck switching converter implemented with a peak current servo, where sampling and comparing the LX node and reference voltages is achieved, as disclosed in related German application DE 10 2016 217 857.1 (DS15-021). The circuit samples node voltage Vlx, and stores output voltage Vout, across inductor 330, on capacitor 335. Reference voltage Vref is also sampled. Reference current Iref is drawn through matched PMOS 350, which matches part of the high side pass-device. The reference current generates a voltage drop across the matched devices, which is compared to the voltage drop in high side pass-device 320, turned on with gatP low, and gP_n high, through inverter 310. Sampling switches 340 and 360 are turned on with the same control signal gP_n, through driver 345. The voltage on Vlx will ring and eventually settle. When high side pass-device 320 is turned off by gP_n going low, the sampling switches will also turn off. This will store the final values of Vlx and Vref, on sampling capacitors 370 and 375, as inputs to comparator 380. High side device 320 is typically, but not limited to, a PMOS device.

Comparator 380 only samples the final values during low side device 325 on time, to ensure high accuracy and low complexity. The comparator may be of the sense-amplifier type, but is not limited to this type of comparator. Low side device 325 is turned on with gatN high, as determined by gN low, through driver 315. The comparator determines which voltage is larger, the final node voltage Vlx at the end of the high side device on time, or the reference voltage Vref. If Vlx is less than Vref, then the current in the high side device is greater than Iref. The output of the comparator sets an output signal, when the peak coil current Icoil is greater than the target current limit, as determined by an operational transconductance amplifier (OTA) programmed to a maximum value. Low side device 325 is typically, but not limited to, an NMOS device.

Figure 4:
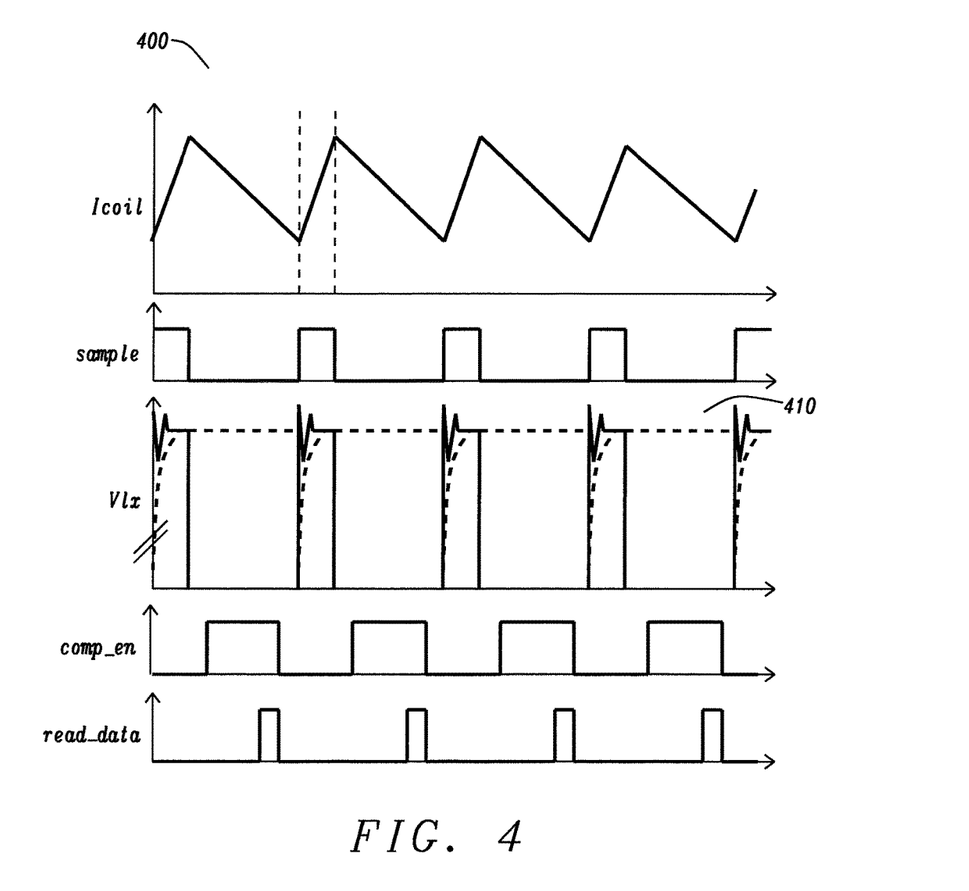
FIG. 4 shows the operation of the sampled peak-current comparator, embodying the principles of the disclosure.

FIG. 4 shows operation 400 of a sampled peak-current comparator in FIG. 3. The voltage on the drain of the high side pass-device determines coil current Icoil. The difference between this voltage and the supply voltage gives a measure of the coil current across inductor 330. When the high side device 320 is turned on, the supply voltage Vref and the voltage on the high side device drain Vlx will ring due to parasitic inductance. Typically this ringing will have settled well before the high side device is turned back off. The voltage on this capacitor settles over the high side device on time, and is assumed to be the same as the LX voltage, by the time the high side device turns back off. Just before the high side device turns off, the sampling switch is opened, and the final value of the LX voltage is stored on the sampling capacitor. Signal sample illustrates the window where node voltage Vlx is sampled with sampling switch 340 onto capacitor 375, and the high side device is turned off. When low side device 325 turns on, Vlx goes low and sampled voltage 410 is held at its final value, until high side device 320 turns on again.

Vlx can then be compared with known reference voltage Vref, when comp_en goes high, during the low side device on time. The result of this comparison can then be read out, when read_data goes high, just before the high side device is turned back on again. The comparator output goes high when peak coil current Icoil is above the target current limit and low when peak coil current Icoil has been reduced below the target current limit.

If the emulated current signal is converted back to a current proportional to the coil current, and this current is drawn through a PMOS device that is matched with pass-device 320, the voltage across the matched device can be directly compared to the LX voltage. This current signal is indicated in the circuit diagram by bias current Iref.

In an ideal system, the emulated current would accurately follow the coil current naturally. In the actual circuit, many things may cause the emulated signal to drift away from the actual coil current value. The most likely things to cause this are the value of the pull up current is different than the ideal value of vdd−vout, the pull down current is different than the ideal value of vout, the pull-up current switches on or off at a slightly different time changing the slope of the coil current, or the pull-down current switches on or off at a slightly different time changing the slope of the coil current.

In present disclosure, these non-idealities will be reflected in the emulated current signal, as a parasitic current source on-to, or off-of, a current integrating capacitor. They will cause the emulated current signal to drift up or down over time, in the same way as a stray current source. However it is unlikely that these errors will change dramatically, or often, over time. As such, these errors may be countered by using a variable current source to balance them and eliminate their effects.

In the present disclosure, a variable current source is placed onto the current integrating capacitor. If the emulated current starts to drift up higher than the coil current signal, current sinks off the capacitor and down to ground. If the emulated current starts to drift down lower than the coil current signal, current sources from the supply to the capacitor.

Figure 5A:
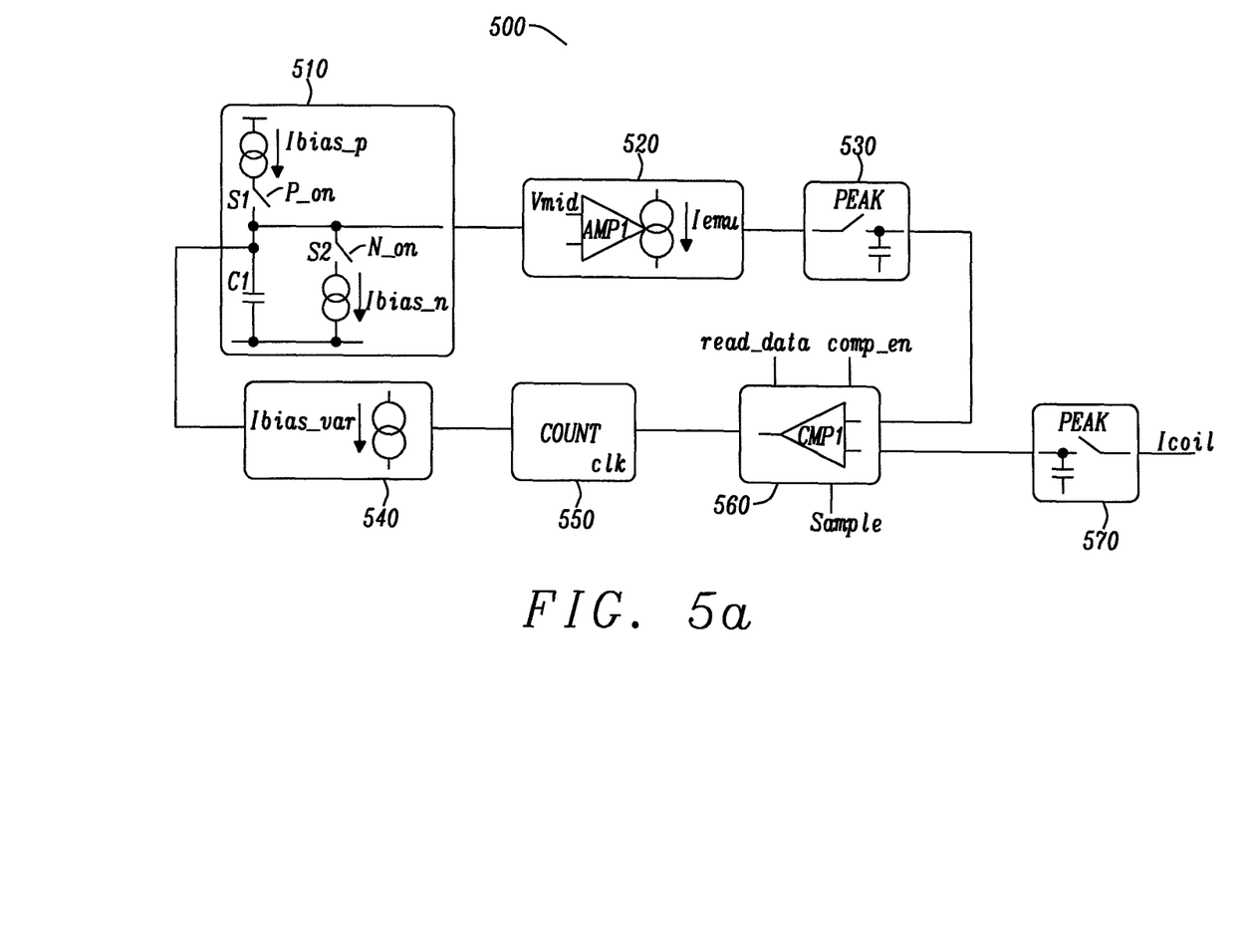
FIG. 5a illustrates a block diagram of the current emulation auto-correlation system for the current bleed, embodying the principles of the disclosure.

FIG. 5a illustrates block diagram 500 of the current emulation auto-correlation system for the current bleed. Current emulation block 510 is shown on the top left. This contains two switched current sources, Ibias_p through switch S1 P_on, and Ibias_n through switch S2 N_on, and current integrating capacitor C1. Below this block is variable current source 540 Ibias_var for the current-bleed. This will add a variable positive or negative current onto the current integrating capacitor.

This will then balance any non-idealities in the current emulation system that act to shift the voltage on the capacitor over time, and the non-idealities act as a parasitic current on-to, or off-of, the capacitor. The voltage on the current integrating capacitor is transformed into current signal Iemu, proportional to the coil current, in AMP1 520. The emulated current can then be compared to the actual coil current. Peak current 570, as determined by voltage Vlx across the coil, is compared with peak signal 530, of the emulated current on Vref. Comparator 560 reads and compares the outputs of 570 and 530, using two sample and hold blocks, and control signals comp_en and read_data. The result of this comparison increments or decrements counter 550, each cycle.

In the proposed disclosure, the output from sampled current comparator 560 is used to control current source 510. If the sampled current comparator indicates that the final current in the coil is lower than the emulated current signal, then the variable current source is adjusted to be slightly higher, sourcing slightly more current from the supply to capacitor C1. Over time this adjustment will cause the current source to rise to match the non-idealities in the circuit, and bring the emulated current to match the coil current. In the same way, if the sampled current comparator indicates that the final current in the coil is higher than the emulated current signal, the variable current source is adjusted to be slightly lower, sinking slightly more current from the capacitor to ground.

Figure 5B:
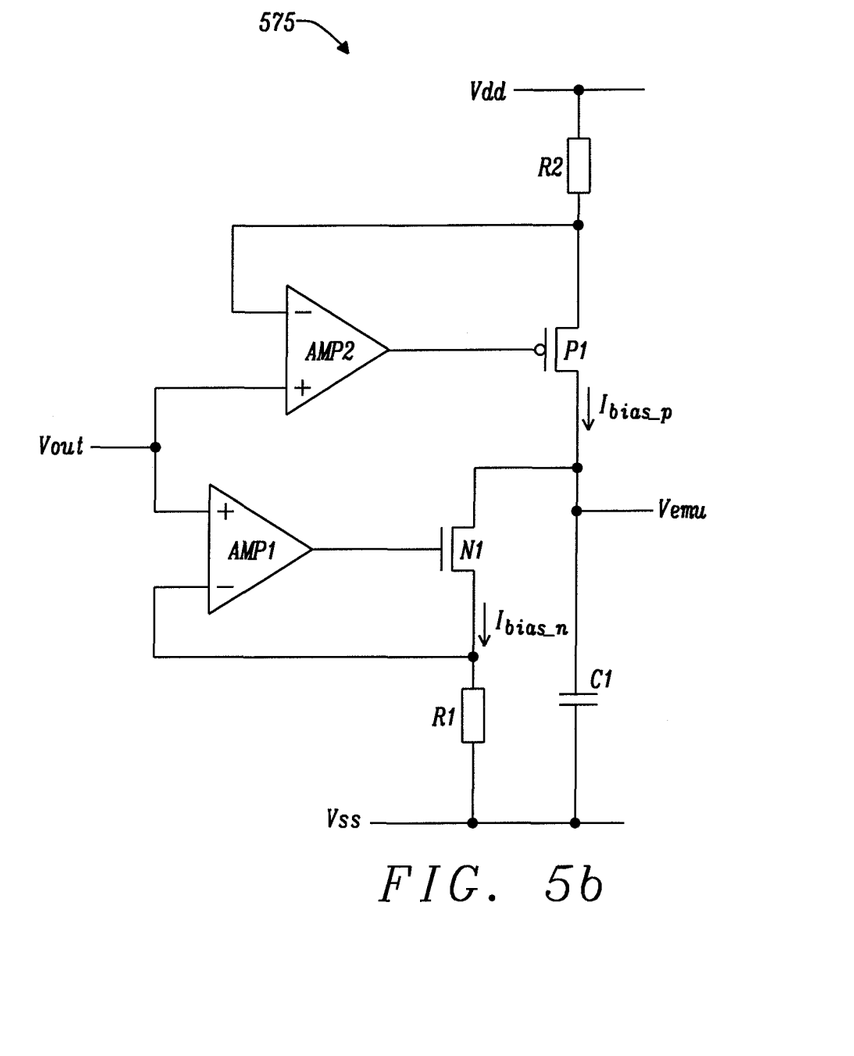
FIG. 5b is an example of a circuit diagram providing the current sources proportional to the output voltage, and the current integrating capacitor proportional to the inductor, embodying the principles of the disclosure.

FIG. 5b is an example of a circuit 575, providing the current sources proportional to the output voltage, and the current integrating capacitor proportional to the inductor current integrating capacitor C1 proportional to inductor L. Output voltage Vout is input to the two amplifiers, AMP1 and AMP2. The first amplifier AMP1 controls the NMOS device N1 current, such that the voltage across resistor R1 is the same as Vout. This gives current IBIAS_N through that branch proportional to Vout. The second amplifier AMP2 controls the PMOS device P1 current such, that the voltage at the bottom of resistor R2 is the same as Vout. This gives the voltage across R2 as (Vdd−Vout), and current IBIAS_P through that branch proportional to (Vdd−Vout). With the current integrating capacitor C1 proportional to inductor L, the current slopes are correct.

Figure 6A:
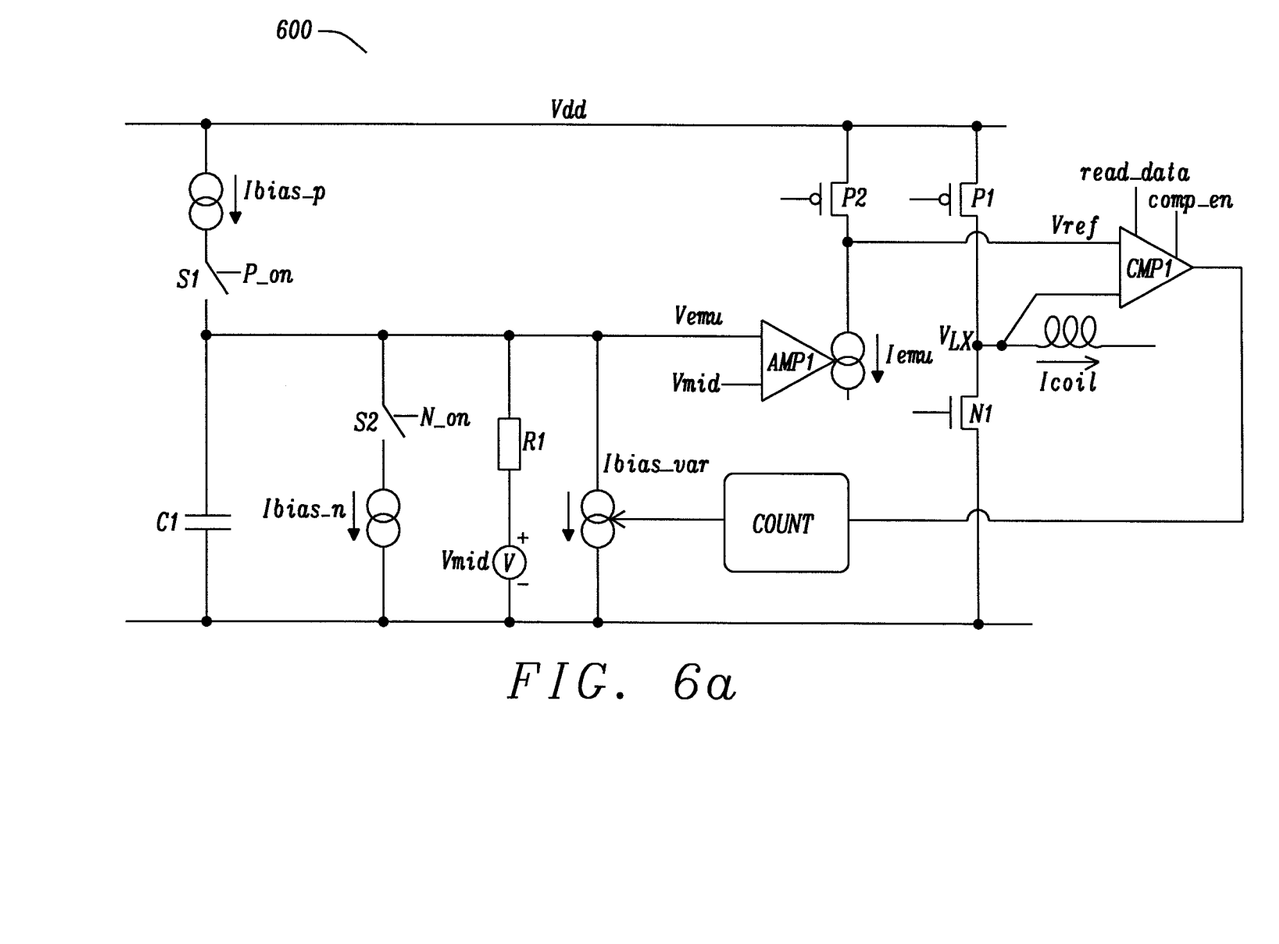
FIG. 6a shows a diagram of one embodiment of the disclosure, with the capacitor on which the emulated coil current signal is stored is shown.

FIG. 6a shows a diagram of one embodiment of the disclosure, with the capacitor on which the emulated coil current signal is stored is shown. The current integrating capacitor C1 is on the bottom left, and pass-devices P1 and N1, and the external coil, are shown on the right. When high side device P1 is on, switch S1 is closed, and bias Ibias_p is sourced onto the capacitor. When low side device N1 is on, switch S2 is closed, and bias Ibias_n flows from the capacitor to ground. Amplifier AMP1 generates current Iemu, proportional to the difference between reference voltage Vmid and voltage on the capacitor Vemu, flowing through current mirror P2, where P2 is matched to high side pass-device P1. The voltage drop across P2 can be compared to the voltage drop across P1, to establish whether the emulated current is higher or lower than actual coil current Icoil. The result of this comparison is output to counter COUNT, which then increments or decrements a stored value. The output of the counter controls the value of variable current source Ibias_var, to bleed current from the capacitor and match any errors from the switched biases. Optionally, resistor R1 may connect to AMP1 across voltage Vmid, to help keep the operating point of the capacitor well controlled.

While the above embodiment uses a current into an integrating capacitor to emulate the coil current, another embodiment could use any sort of integrating circuit to compute the current slope (d(Iload)/dt=Vinductor/L) to then emulate the coil current. This could include digital counters, which may be beneficial in very deep submicron processes, where such digital circuits are very small.

Figure 6B:
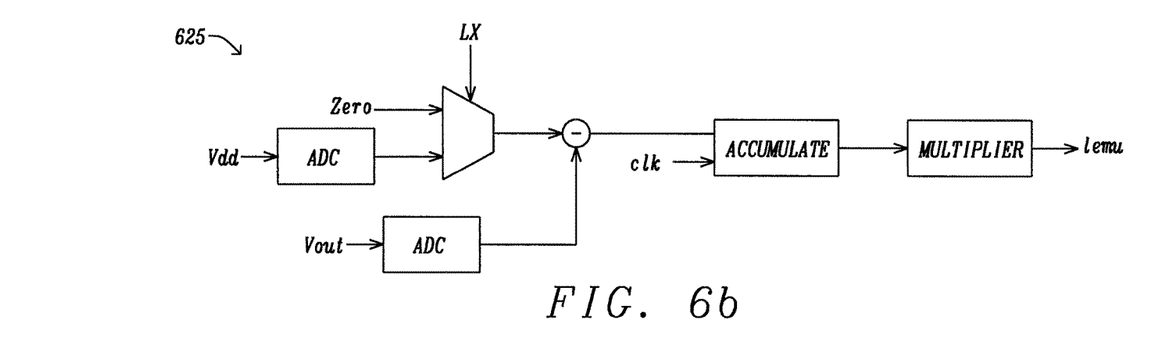
FIG. 6b illustrates a first diagram of a digital embodiment of the disclosure.

FIG. 6b illustrates diagram 625, of a first digital embodiment of the disclosure. The digital embodiment would measure supply voltage Vdd and output voltage Vout using two analog-to-digital converters (ADC). The signal from the supply ADC is multiplexed with a signal that is equal to Zero. The mutliplexer is controlled by the state of the LX node, or a logical signal that is equivalent to that, such as the high-side switch control signal. When the LX voltage is high the current in the coil will be increasing with slope proportional to Vdd-Vout. The multiplexer will output a value of Vdd. The output voltage measurement would then be subtracted from the supply voltage measurement. This value, proportional to Vdd-Vout, is then integrated by the accumulator, Accumulate, and scaled correctly by the Multiplier. When the LX voltage is low the current in the coil will be decreasing with slope proportional to Vout. The multiplexer will be outputting a value equal to zero. The output voltage will still be subtracted from this, giving an output of (−Vout). The accumulator will integrate this value, during this phase of the operation. FIG. 6b would replace block 510 in FIG. 5.

Figure 6C:
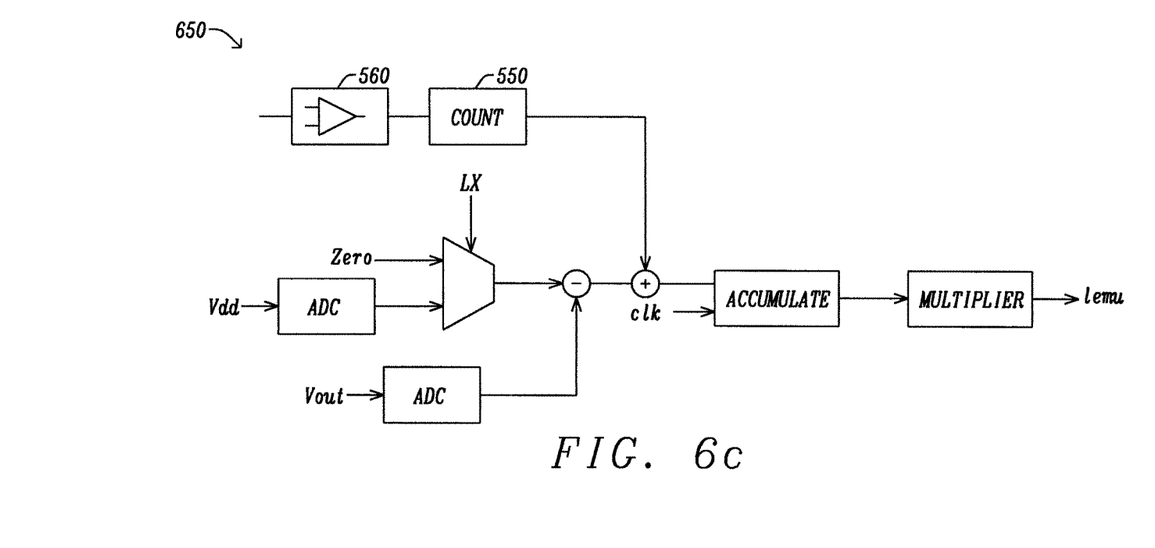
FIG. 6c shows a second diagram of the digital embodiment of the disclosure.

FIG. 6c shows second diagram 650, of the digital embodiment of the disclosure. To modify the circuit in FIG. 5, with a replacement block for 510, the output of counter 550 is now subtracted, or added, to the resulting slope values as shown. Comparator 560 reads and compares the outputs of 570 and 530, and the result of the comparison increments or decrements counter 550, each cycle.

Figure 7:
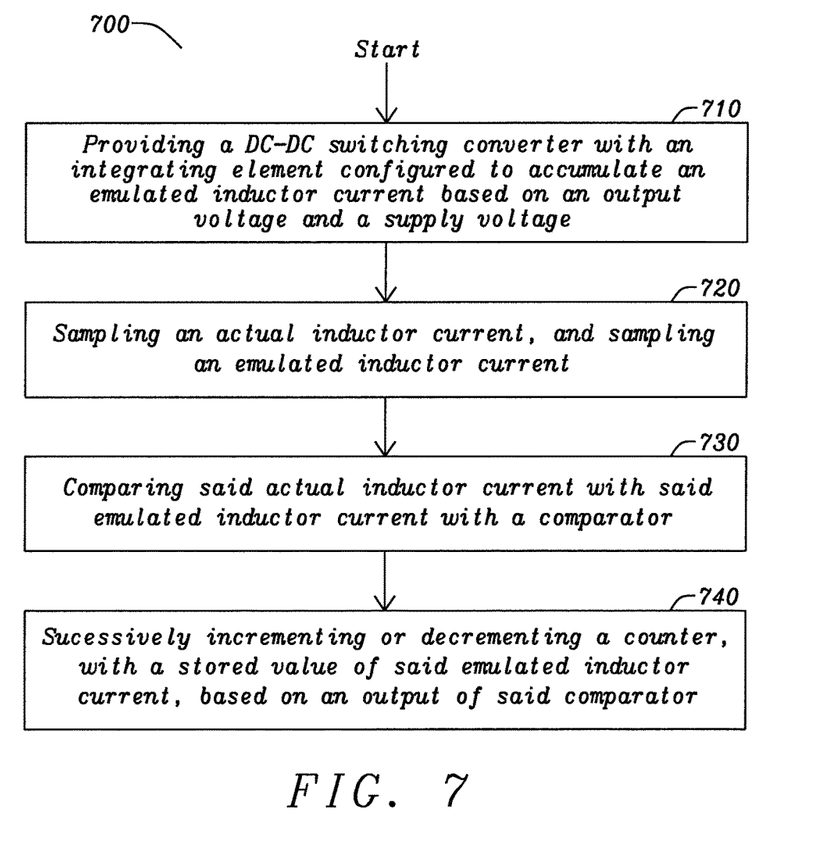
FIG. 7 is a flow chart of a method for current emulation auto-calibration, in a DC-DC switching converter, embodying the principles of the disclosure.

FIG. 7 is flow chart 700, of a method for current emulation auto-calibration, in a DC-DC switching converter, providing a current emulation circuit for current-mode control, in a peak-current sampling circuit. The steps include 710, providing a DC-DC switching converter with an integrating element configured to accumulate an emulated inductor current based on an output voltage and a supply voltage. The steps also include 720, sampling an actual inductor current, and sampling an emulated inductor current. The steps also include 730, comparing the actual inductor current with the emulated inductor current with a comparator. The steps also include 740, successively incrementing or decrementing a counter, with a stored value of the emulated inductor current, based on an output of the comparator.

The advantages of one or more embodiments of the present disclosure include allowing fast switching frequencies in current-mode control Buck, Boost, Buck-Boost and other types of DC-DC switching power converters. This allows the integration of fast phases with other phases of very different characteristics, with no external current sense element, or pin, required to allow external coil current measurement. The function may be achieved with current-mode control, mixing low-frequency peak-mode phases with high-frequency peak-mode phases. The function may also be achieved mixing low-frequency peak-mode phases with high-frequency valley-mode phases. The function may also be achieved mixing low-frequency peak-mode phases with high-frequency average-mode phases.

While this invention has been particularly shown and described with reference to the preferred embodiments thereof, it will be understood by those skilled in the art that various changes in form and details may be made without departing from the spirit and scope of the invention.

The invention claimed is:

1. A DC-DC switching converter with current emulation auto-calibration, comprising:
    an integrating element configured to accumulate an emulated inductor current based on an output voltage and a supply voltage;
    a first sampling circuit, configured to obtain a sample of an actual inductor current;
    a second sampling circuit, configured to obtain a sample of said emulated inductor current;
    a comparator configured to compare said sample of said actual inductor current with said sample of said emulated inductor current; and
    a counter, configured to increment or decrement a stored value of said emulated inductor current, based on an output of said comparator.

2. The DC-DC switching converter of claim 1, further comprising a high side device and a low side device configured to drive an inductor.

3. The DC-DC switching converter of claim 2, wherein a high-side switched current source is configured to add charge to said integrating element when said high-side device is on, wherein said integrating element is a capacitor.

4. The DC-DC switching converter of claim 3, wherein a low-side switched current source is configured to remove charge from said integrating element when said low-side device is on.

5. The DC-DC switching converter of claim 4, wherein said low-side switched current source is connected to said integrating element by a switch controlled by a low-side on signal.

6. The DC-DC switching converter of claim 3, wherein said high-side switched current source is connected to said integrating element by a switch controlled by a high-side on signal.

7. The DC-DC switching converter of claim 2, wherein said high side device, said low side device, and said inductor are configured to be controlled based on said emulated inductor current.

8. The DC-DC switching converter of claim 2, wherein said first sampling circuit is configured to sample a current through said high side device just before a point when said high side device switches off.

9. The DC-DC switching converter of claim 2, wherein said comparator is configured to compare said actual inductor current with said emulated inductor current during a low side device on time.

10. The DC-DC switching converter of claim 2, wherein said integrating element is charged with a slope proportional to the difference in a supply voltage and an output voltage of said DC-DC switching converter, when said high side device is on.

11. The DC-DC switching converter of claim 2, wherein said integrating element is discharged with a slope proportional to an output voltage of said DC-DC switching converter, when said low side device is on.

12. The DC-DC switching converter of claim 2, further comprising one or more PMOS devices, matched to said high side device, configured to provide said emulated inductor current.

13. The DC-DC switching converter of claim 12, wherein a voltage drop across said one or more PMOS devices is compared to a voltage drop across said high side device, to establish whether said emulated inductor current is higher or lower than said actual inductor current.

14. The DC-DC switching converter of claim 1, wherein said sampling circuit comprises a sampled comparator.

15. The DC-DC switching converter of claim 1, wherein said integrating element comprises a current integrating capacitor.

16. The DC-DC switching converter of claim 1, wherein a variable current source, is configured to add a positive or negative current onto said integrating element based on said stored value.

17. The DC-DC switching converter of claim 16, wherein said comparator is configured to control said variable current source, and when said variable current source is adjusted higher, said variable current source is configured to source more current from a supply to said integrating element.

18. The DC-DC switching converter of claim 16, wherein said comparator is configured to control said variable current source, and when said variable current source is adjusted lower, said variable current source is configured to sink more current from said integrating element to ground.

19. The DC-DC switching converter of claim 1, wherein said switching converter is a Buck, Boost, or Buck-Boost DC-DC switching converter.

20. The DC-DC switching converter of claim 1, wherein said switching converter is configured to operate at frequencies above 10 MHz.

21. The DC-DC switching converter of claim 1, wherein said counter is configured to auto-calibrate said emulated inductor current over more than one cycle.

22. The DC-DC switching converter of claim 1, wherein a resistor is connected across an amplifier and a reference voltage to maintain an operating point of said integrating element.

23. The DC-DC switching converter of claim 1, configured to be operated using current-mode control, and comprising low-frequency peak-mode phases and high-frequency peak-mode phases.

24. The DC-DC switching converter of claim 1, configured to be operated using current-mode control, and comprising low-frequency peak-mode phases and high-frequency valley-mode phases.

25. The DC-DC switching converter of claim 1, configured to be operated using current-mode control, and comprising low-frequency peak-mode phases and high-frequency average-mode phases.

26. The DC-DC switching converter of claim 1, wherein a supply voltage and an output voltage are measured using analog-to-digital converters.

27. The DC-DC switching converter of claim 26, further comprising a multiplexer controlled by a high side on signal, an accumulator, and multiplier.

28. The DC-DC switching converter of claim 26, wherein a digital counter is used as an integrating circuit to compute a current slope and to emulate a coil current.

29. A method for current emulation auto-calibration, in a DC-DC switching converter, comprising the steps of:
   providing a DC-DC switching converter with an integrating element configured to accumulate an emulated inductor current based on an output voltage and a supply voltage;
   sampling an actual inductor current, and sampling an emulated inductor current;
   comparing said actual inductor current with said emulated inductor current with a comparator; and
   successively incrementing or decrementing a counter, with a stored value of said emulated inductor current, based on an output of said comparator.

30. The method of claim 29, wherein said emulated inductor current controls a high side device and a low side device, and an inductor.

31. The method of claim 30, wherein sampling said high side device current is done just before a point when said high side device switches off.

32. The method of claim 30, wherein said comparator compares said actual inductor current with said emulated inductor current during said low side device on time.

33. The method of claim 30, wherein said integrating element charges with a slope proportional to the difference in a supply voltage and an output voltage of said DC-DC switching converter, when said high side device is on.

34. The method of claim 30, wherein said integrating element discharges with a slope proportional to an output voltage of said DC-DC switching converter, when said low side device is on.

35. The method of claim 30, wherein one or more PMOS devices, matched to said high side device, provide said emulated inductor current.

36. The method of claim 30, wherein a voltage drop across said one or more PMOS devices compares to a voltage drop across said high side device, establishing whether said emulated inductor current is higher or lower than said actual inductor current.

37. The method of claim 29, wherein a variable current source adds a positive or negative current, onto said integrating element based on said stored value, and wherein said integrating element is a capacitor.

38. The method of claim 37, wherein said comparator controls said variable current source, and when said variable current source adjusts higher, said variable current source sources more current from a supply to said integrating element.

39. The method of claim 37, wherein said comparator controls said variable current source, and when said variable current source adjusts lower, said variable current source sinks more current from said integrating element to ground.

40. The method of claim 29, wherein said switching converter operates at frequencies above 10 MHz.

41. The method of claim 29, wherein said counter auto-calibrates said emulated inductor current over more than one cycle.

42. The method of claim 29, wherein a high-side switched current connects to said integrating element by a switch controlled by a high-side on signal.

43. The method of claim 29, wherein a low-side switched current source connects to said integrating element by a switch controlled by a low-side on signal.

44. The method of claim 29, wherein a resistor connects across an amplifier and a reference voltage, maintaining an operating point of a current integrating capacitor.

45. The method of claim 29, comprising operating said DC-DC switching converter using current-mode control, and wherein said DC-DC switching converter comprises low-frequency peak-mode phases and high-frequency peak-mode phases.

46. The method of claim 29, comprising operating said DC-DC switching converter using current-mode control, and wherein said DC-DC switching converter comprises low-frequency peak-mode phases and high-frequency valley-mode phases.

47. The method of claim 29, comprising operating said DC-DC switching converter using current-mode control, and wherein said DC-DC switching converter comprises low-frequency peak-mode phases and high-frequency average-mode phases.

* * * * *